United States Patent
Huot et al.

(10) Patent No.: US 9,482,367 B2
(45) Date of Patent: Nov. 1, 2016

(54) LAYING VESSEL FOR LAYING PIPELINES ON THE BED OF A BODY OF WATER, AND LAYING VESSEL OPERATING METHOD

(75) Inventors: Emmanuel Huot, St Martin de Nigelles (FR); Carlo Chiodini, Maniago (IT)

(73) Assignee: SAIPEM S.P.A., San Donato Milanese (IT)

( * ) Notice: Subject to any disclaimer, the term of this patent is extended or adjusted under 35 U.S.C. 154(b) by 72 days.

(21) Appl. No.: 14/000,342

(22) PCT Filed: Feb. 24, 2012

(86) PCT No.: PCT/IB2012/050872
§ 371 (c)(1),
(2), (4) Date: Jan. 30, 2014

(87) PCT Pub. No.: WO2012/114318
PCT Pub. Date: Aug. 30, 2012

(65) Prior Publication Data
US 2014/0241808 A1     Aug. 28, 2014

(30) Foreign Application Priority Data

Feb. 24, 2011   (IT) .............................. MI2011A0282

(51) Int. Cl.
*F16L 1/16* (2006.01)
*F16L 1/20* (2006.01)
*F16L 1/19* (2006.01)

(52) U.S. Cl.
CPC .................. *F16L 1/16* (2013.01); *F16L 1/166* (2013.01); *F16L 1/19* (2013.01); *F16L 1/20* (2013.01); *F16L 1/202* (2013.01)

(58) Field of Classification Search
CPC ............ F16L 1/12; F16L 1/19; B63B 35/03; B63B 27/08
USPC ........................................................ 405/158
See application file for complete search history.

(56) References Cited

FOREIGN PATENT DOCUMENTS

| GB | 2 310 269 A | 8/1997 |
|----|-------------|--------|
| WO | WO 01/07812 A1 | 2/2001 |
| WO | WO 2009/002142 A1 | 12/2008 |
| WO | WO 2009/082191 A1 | 7/2009 |
| WO | WO 2009/145607 A1 | 12/2009 |
| WO | WO 2011/016719 A1 | 2/2011 |

OTHER PUBLICATIONS

International Search Report and Written Opinion for International Application No. PCT/IB2012/050872 dated Jul. 27, 2012.
Notification Concerning Submission, Obtention or Transmittal of Priority Document (Form PCT/IB/304) dated May 1, 2012.

*Primary Examiner* — Tara M. Pinnock
(74) *Attorney, Agent, or Firm* — Neal, Gerber & Eisenberg LLP

(57) ABSTRACT

A laying vessel configured to lay pipelines on the bed of a body of water has a floating structure; a laying tower hinged to the floating structure and configured to assemble and lay a pipeline on the bed of the body of water; and an A&R system configured to abandon and recover the pipeline; and wherein the A&R system has a haul line; and a sheave assembly configured to guide the haul line, and which is fitted to the floating structure to move between a work position at the laying tower, and a position away from the laying tower.

27 Claims, 10 Drawing Sheets

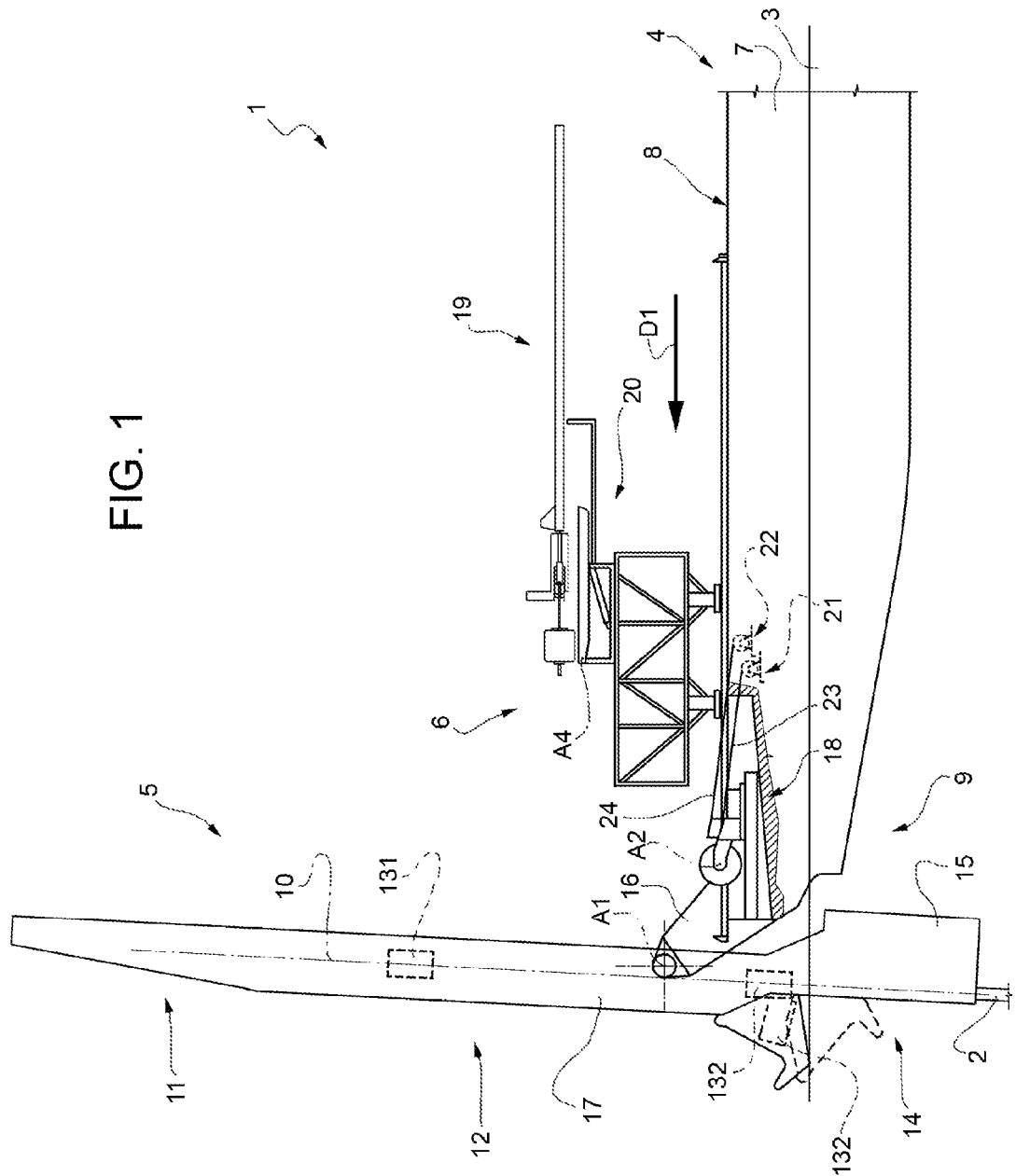

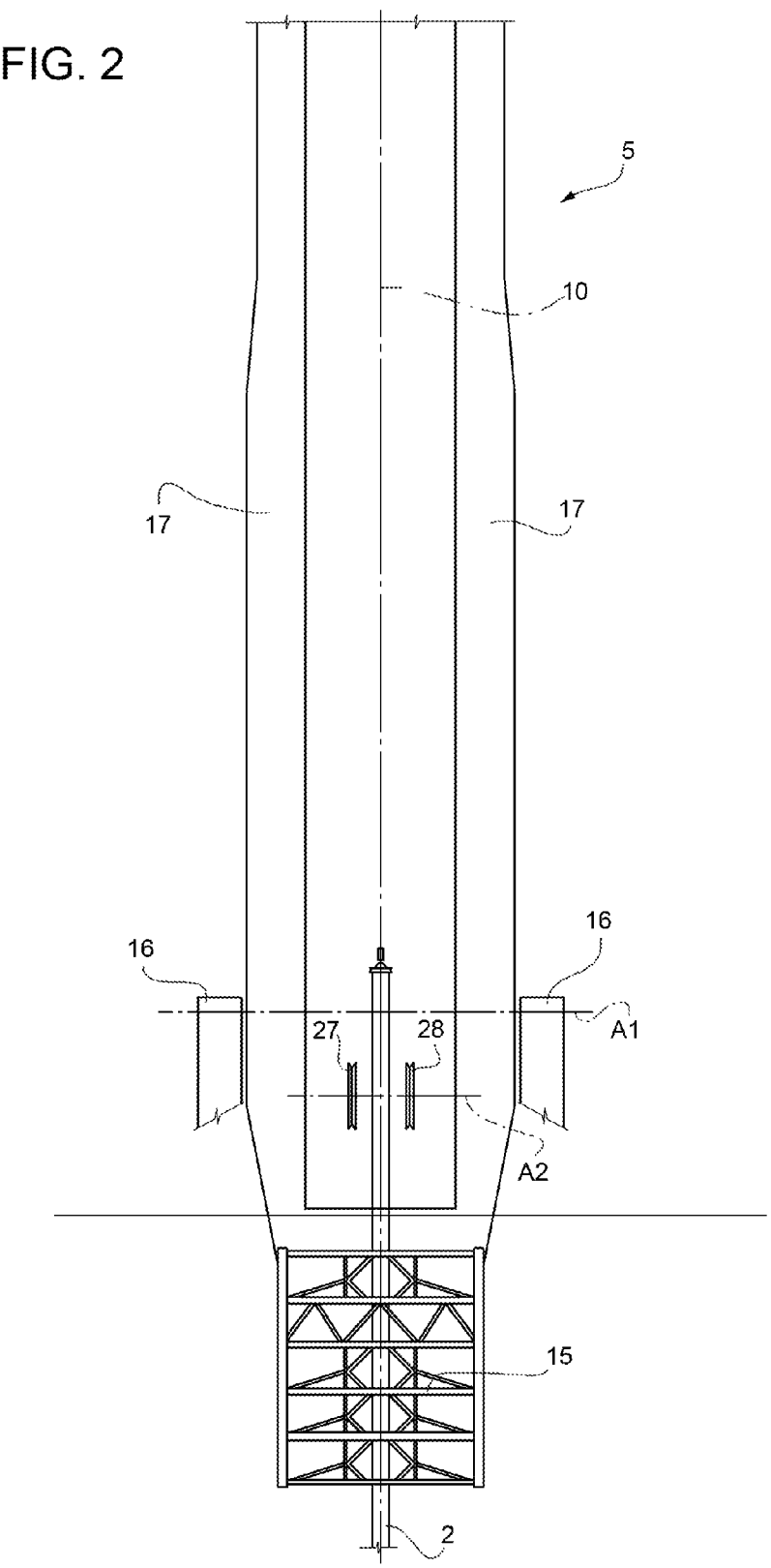

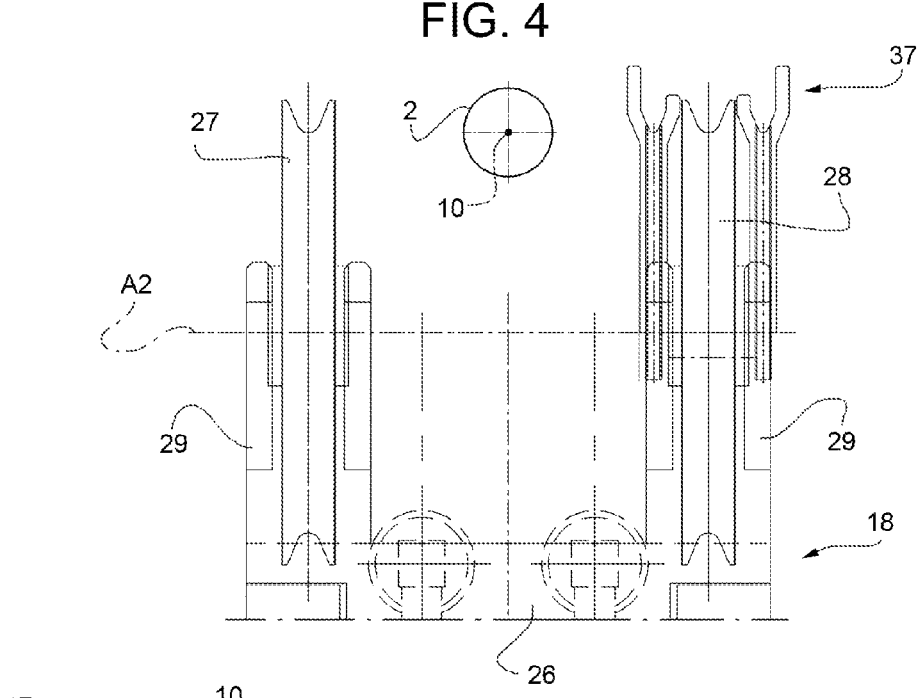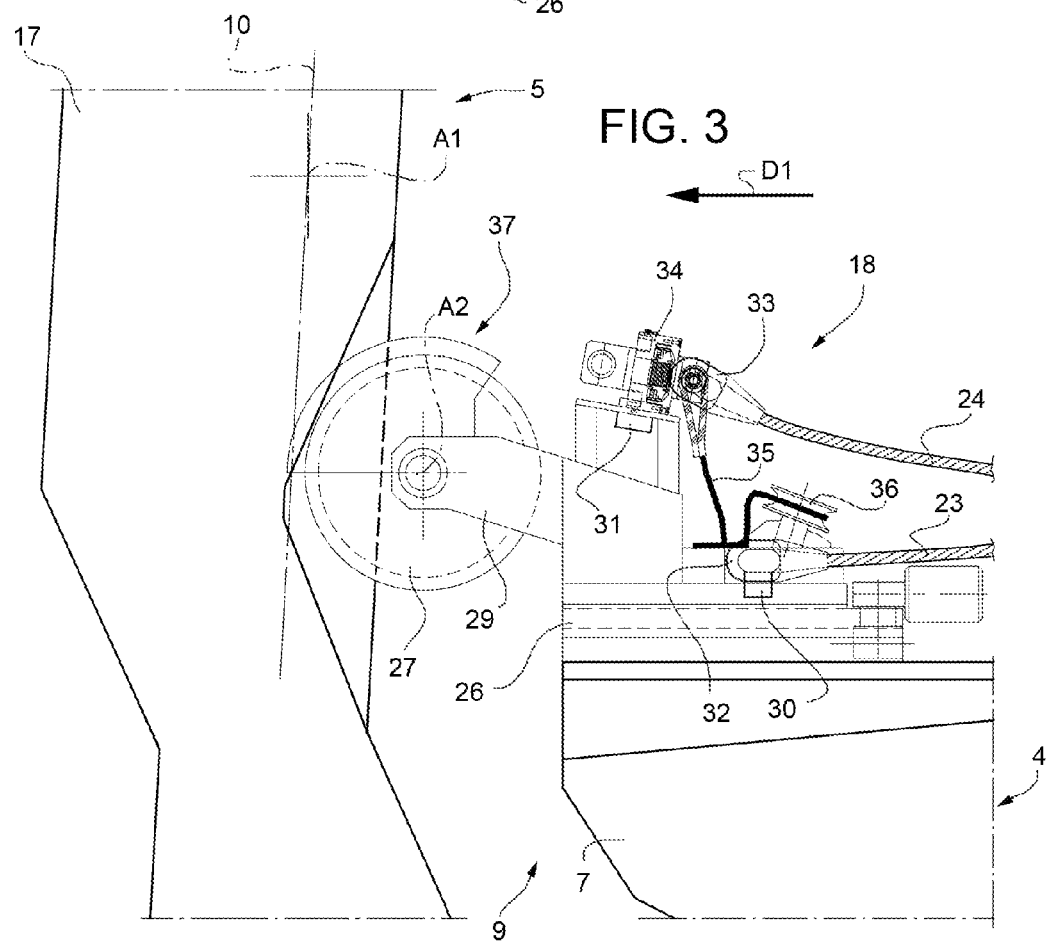

LAYING VESSEL FOR LAYING PIPELINES ON THE BED OF A BODY OF WATER, AND LAYING VESSEL OPERATING METHOD

PRIORITY CLAIM

This application is a national stage application of PCT/IB2012/050872, filed on Feb. 24, 2012, which claims the benefit of and priority to Italian Patent Application No. MI2011A 000282, filed on Feb. 24, 2011, the entire contents of which are each incorporated by reference herein.

BACKGROUND

Certain known laying vessels for laying pipelines on the bed of a body of water are described in PCT Patent Application No. WO 2009/082191 A1, PCT Patent Application No. WO 2009/145607 A1, and PCT Patent Application No. WO 01/07812 A1. As is known, abandon and recover systems ("A&R systems") are used when laying work is interrupted by bad weather, and the pipeline being laid has to be abandoned on the bed of the body of water and recovered later, to continue laying work, when the weather improves. Laying vessels also have to be configured to cope with emergency situations—especially sudden changes in weather—so as to switch rapidly from laying mode to pipeline abandon mode.

To switch as fast as possible from laying to abandon mode, the A&R system is normally fitted directly to the laying tower, as shown in PCT Patent Application No. WO 2009/145607 A1 and PCT Patent Application No. WO 01/07812 A1, or inside the laying tower, as shown in PCT Patent Application No. WO 2009/082191 A1.

Known technical solutions often have the drawback of impeding access to the laying tower, and not always enabling easy positioning of the haul line on the sheave assembly. In this connection, it should be appreciated that the haul line is defined by at least one rope of considerable size and weight per unit length, and which can only be maneuvered using special cranes.

SUMMARY

The present disclosure relates to a laying vessel configured to lay pipelines on the bed of a body of water.

More specifically, the present disclosure relates to a laying vessel comprising a floating structure; a laying tower hinged to the floating structure and configured to assemble and lay a pipeline on the bed of the body of water; and an A&R system configured to abandon and recover the pipeline; wherein the A&R system comprises a haul line; and a sheave assembly configured to guide the haul line at the laying tower.

It is an advantage of the present disclosure to provide a laying vessel featuring an A&R system that can be activated rapidly, and which, at the same time, does not obstruct laying work.

According to one embodiment of the present disclosure, there is provided a laying vessel configured to lay pipelines on the bed of a body of water, the laying vessel comprising a floating structure; a laying tower hinged to the floating structure about a first axis of rotation and configured to assemble and lay a pipeline on the bed of the body of water; and an A&R system configured to abandon and recover the pipeline; wherein the A&R system comprises a haul line; and a sheave assembly configured to guide the haul line, and which is fitted to the floating structure to move between a work position at the laying tower, and a rest position away from the laying tower.

According to one embodiment of the present disclosure, the sheave assembly is fitted directly to the floating structure, and is movable between a work position at the laying tower, and a rest position where it can be set up before being moved into the work position where crane operation or even crew work is more difficult. More specifically, the haul line can be secured beforehand to the sheave assembly in the rest position, and later drawn into the work position together with the sheave assembly.

In one embodiment of the disclosure, the laying tower has a gantry structure, and defines a laying line between two elongated members of the gantry structure; and the sheave assembly is advantageously insertable at least partly between the two elongated members, and close to the laying line, in the work position.

In one embodiment, the sheave assembly is movable along a plane beneath, and in a direction perpendicular to, the first axis of rotation.

The first configuration provides for a more spacious layout on the vessel, and the second configuration for improving movement of the sheave assembly.

In one embodiment, the laying tower comprises at least two gripping assemblies, at least one of which is movable with respect to the other; and the sheave assembly is movable along a plane between the two gripping assemblies.

The sheave assembly can thus be set to the work position while the bottom gripping assembly supports the pipeline.

In one embodiment, the sheave assembly comprises a sledge; and a first and second sheave mounted to rotate about a second axis of rotation parallel to the first axis of rotation.

In one embodiment, the first and second sheave are located on opposite sides of the laying line.

The first and second sheave can thus be positioned substantially tangent to a plane through the laying line.

In one embodiment, the A&R system comprises a first and second winch; a first and second rope operated by the first and second winch respectively; and a connecting device configured to connect the ends of the first and second rope to form the haul line.

So configured, the haul line halves the load on the rope section.

In one embodiment of the disclosure, the A&R system comprises an elongated auxiliary tool configured to be retained by the laying tower along the laying line, and to be connected to the pipeline. That is, the end portion of the pipeline still inside the laying tower is connected to an auxiliary tool configured to assist the A&R procedure, in particular by comprising a dummy string which is gripped by the laying tower; a sledge gripped by the laying tower; and a third sheave which rotates about a third axis of rotation with respect to the sledge to guide the haul line.

The auxiliary tool also has the advantage of comprising a messenger line, which is first wound about the third sheave. The messenger line can be connected to the first rope and wound to draw the end of the first rope up to the end of the second rope, to join the first and second rope, so the resulting haul line extends about the first, second and third sheave and is actually connected indirectly to the pipeline.

When laying the pipeline, the auxiliary tool is set to a rest position, at a distance from the laying tower, to avoid interfering with the laying work. In one embodiment, the auxiliary tool is mounted on a locating device configured to support it and to position it on and remove it from the laying tower. More specifically, the locating device is fitted movably to the floating structure, is insertable at least partly inside the laying tower, and is movable in a designated or given direction along the floating structure.

More specifically, the locating device comprises a first frame mounted to move along the floating structure; and a support, which tilts about a fourth axis of rotation parallel to the first axis of rotation, and is configured to house the auxiliary tool.

So configured, the auxiliary tool can be inserted inside the laying tower in a direction parallel to the laying line.

The locating device also comprises a second frame fitted movably to the first frame; and the tiltable support is fitted to the second frame.

This enables precise positioning of the auxiliary tool with respect to the laying tower.

The present disclosure also relates to a laying vessel operating method, in particular for converting the laying vessel from a laying configuration to an A&R configuration and vice versa.

According to one embodiment of the present disclosure, there is provided a method of operating a laying vessel, the laying vessel comprising a floating structure; a laying tower hinged to the floating structure about a first axis of rotation and configured to assemble and lay a pipeline on the bed of the body of water; and an A&R system configured to abandon and recover the pipeline; wherein the A&R system comprises a haul line; and a sheave assembly configured to guide the haul line; the method comprising the step of selectively running the sheave assembly along the floating structure, between a work position at the laying tower, and a rest position away from the laying tower.

The sheave assembly can thus be moved rapidly between a work position, in which it is used in the A&R procedure, and a rest position, in which it does not interfere with laying work.

In one embodiment of the disclosure, the method comprises the step of connecting the haul line to the sheave assembly before moving the sheave assembly into the work position.

The present disclosure also relates to a method of setting a pipeline laying vessel to a pipeline abandon mode.

According to one embodiment of the present disclosure, there is provided a method of setting a pipeline laying vessel to a pipeline abandon mode, the method comprising the steps of:
- connecting two ropes, configured to form a haul line, to a sheave assembly;
- inserting an auxiliary tool, comprising a sheave, inside a laying tower hinged to the laying vessel;
- connecting the auxiliary tool to the pipeline;
- positioning the sheave beneath the travelling plane of the sheave assembly;
- moving the sheave assembly along the travelling plane from a rest position to a work position, in which the sheave assembly is located at least partly inside the laying tower;
- looping at least one of the two ropes about the sheave assembly and the sheave; and
- connecting the ropes.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which:

FIG. 1 shows a schematic, partly sectioned side view, with parts removed for clarity, of the laying vessel according to the present disclosure;

FIG. 2 shows a partly sectioned rear view, with parts removed for clarity, of a detail of the FIG. 1 laying vessel;

FIG. 3 shows a larger-scale, partly sectioned side view, with parts removed for clarity, of the FIG. 1 vessel with a sheave assembly in the work position;

FIG. 4 shows a larger-scale plan view, with parts removed for clarity, of a detail of the FIG. 3 sheave assembly;

DETAILED DESCRIPTION

Figure 5:
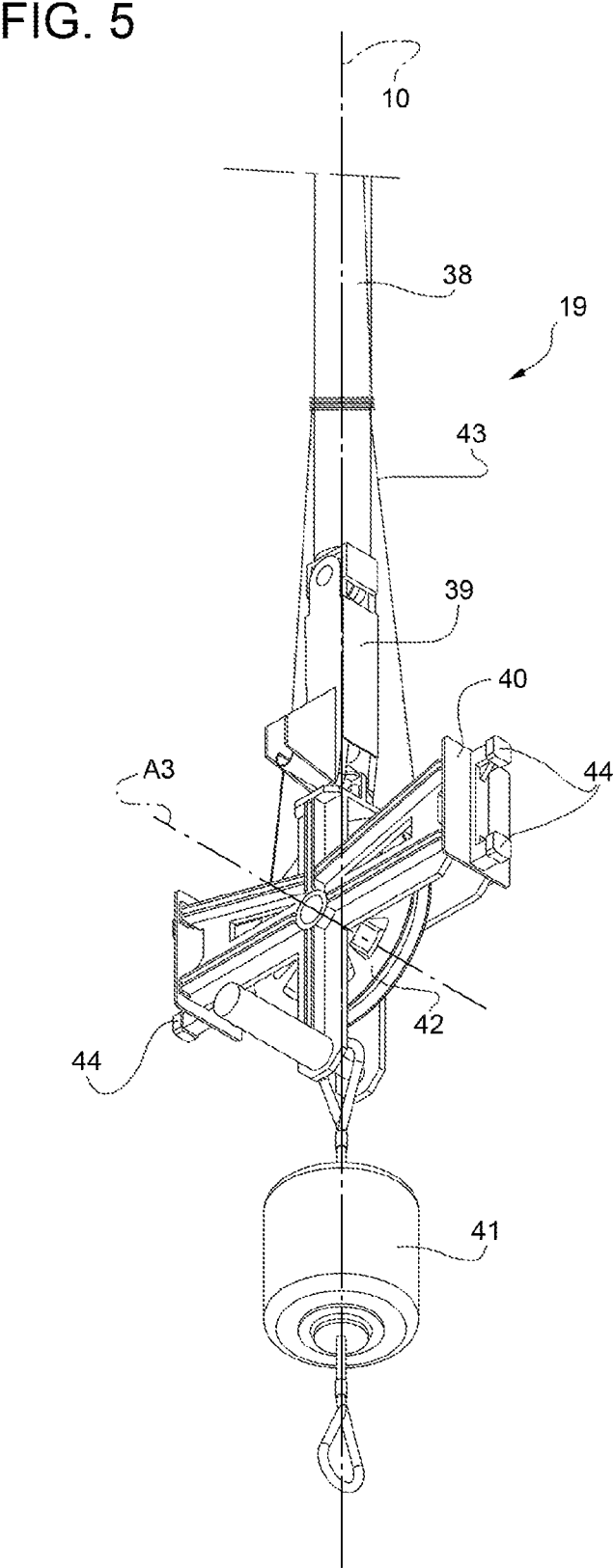
FIG. 5 shows a view in perspective, with parts removed for clarity, of an auxiliary tool of the FIG. 1 laying vessel.

Referring now to the example embodiments of the present disclosure illustrated in FIGS. 1 to 15, number 1 in FIG. 1 indicates as a whole a laying vessel configured to lay a pipeline 2 on the bed (not shown) of a body of water 3.

Laying vessel 1 comprises a floating structure 4; a J-type laying tower 5; and an A&R system 6. Floating structure 4 comprises a hull 7; a weather deck 8; a stern 9; and a bow (not shown in the drawings).

In the example shown, laying tower 5 is mounted at stern 9, and is hinged to rotate selectively about an axis of rotation A1 into a plurality of substantially vertical work positions, and a substantially horizontal rest position (not shown in the drawings).

In one variation (not shown), the laying tower is mounted at the bow, and, in another variation (not shown), is mounted on a platform along a bulwark of the floating structure.

Laying tower 5 defines a laying line 10, and has a top portion 11 equipped with devices (not shown) configured to assemble pipes (not shown) into pipeline 2 as pipeline 2 is laid; a centre portion 12 equipped with a top gripping assembly 131 and bottom gripping assembly 132 configured to grip pipeline 2; and a bottom portion 14 comprising a laying ramp 15. At least one of gripping assemblies 131, 132 is movable parallel to laying line 10 to feed pipeline 2 along laying tower 5 by gripping assemblies 131 and 132 gripping the pipeline alternately. The bottom gripping assembly 132 is hinged to and tilts with respect to laying tower 5 into a withdrawn position (shown by the dash line in FIG. 1) from laying line 10, to permit insertion of bulky equipment along laying tower 5. And floating structure 4 comprises two parallel arms 16 (only one shown in FIG. 1) which extend over weather deck 8 and support laying tower 5 in rotary manner, so the axis of rotation A1 of laying tower 5 is located over weather deck 8, at the ends of arms 16.

As shown in FIG. 2, laying tower 5 is located between arms 16, and comprises a gantry structure comprising two parallel elongated lateral members 17, which, at the bottom ends, support laying ramp 15 defined, in the example shown, by a lattice structure. Elongated members 17 are connected by cross members (not shown), are hinged to arms 16 about axis of rotation A1, and define a gap in which laying line 10 extends.

As shown in FIG. 1, A&R system 6 comprises a sheave assembly 18; an auxiliary tool 19; a locating device 20 configured to position auxiliary tool 19; and two winches 21, 22 comprising respective ropes 23, 24, which are eventually joined to form a haul line 23, 24. In actual use, sheave assembly 18 serves to guide haul line 23, 24 at laying tower 5.

Sheave assembly 18 is fitted to floating structure 4 to move between a rest position (FIG. 1) and a work position (FIG. 3), is located at stern 9, is fitted to move with respect to floating structure 4 along a plane beneath weather deck 8, is connected to an actuator (not shown in the drawings), and is movable in a direction D1 parallel to weather deck 8 and perpendicular to axis of rotation A1.

As shown more clearly in FIG. 3, sheave assembly 18 comprises a sledge 26 fitted movably to floating structure 4.

As shown in FIG. 4, sheave assembly 18 comprises two sheaves 27, 28, which rotate about a common axis of rotation A2 parallel to axis of rotation A1 (FIG. 3). Sheaves 27, 28 are fitted to and project from two forks 29, so they are located on opposite sides of laying line 10 in the work position, and do not interfere with pipeline 2 or auxiliary tool 19 (FIG. 1), which, in use, may be located along laying line 10. Sheaves 27, 28 may thus be positioned tangent to a plane through laying line 10.

As shown in FIG. 3, sheave assembly 18 comprises two fasteners 30, 31 configured to connect respective ends of ropes 23, 24 to sheave assembly 18. More specifically, the ends of ropes 23, 24 are defined by respective eyelets 32, 33, and are connectable to each other by a connecting device 34, which is fixed to sledge 26 by fastener 31, and is connected to the end of rope 24. The ends of ropes 23, 24 are fastened to sheave assembly 18 in the rest position, so they move with sheave assembly 18 into the work position, as opposed to using cranes. Sheave assembly 18 also comprises a temporary rope 35 connected at one end to connecting device 34, and at the other end to an anchor 36 fitted to sledge 26.

As shown in FIG. 4, sheave assembly 18 comprises a guide 37, which extends along a designated or given arc about axis of rotation A2 and on opposite sides of sheave 28 to guide connecting device 34 and temporary rope 35 when releasing and recovering rope 24 from and onto laying vessel 1 (FIG. 3).

As shown in FIG. 5, auxiliary tool 19 is an elongated member shown, in the example, aligned with laying line 10, and comprises, working downwards in FIG. 5, a dummy string 38; a locking device 39 hinged to dummy string 38; a sledge 40 attached to locking device 39; and a float 41 attached to sledge 40 and which connects to pipeline 2. Auxiliary tool 19 also comprises a sheave 42 fitted to sledge 40 to rotate about an axis of rotation A3; and a messenger line 43 connected at both ends to dummy string 38 and guided by sheave 42. Dummy string 38 is configured to be gripped by gripping assemblies 131 and 132 (FIG. 1), and to advance inside laying tower 5 in the same way as pipeline 2; locking device 39 is configured to selectively lock and release sledge 40 to and from dummy string 38; and sledge 40 is guided along laying tower 5 and immersed in the body of water 3 when abandoning and recovering the pipeline. More specifically, sledge 40 comprises skids 44 configured to engage grooves (not shown) parallel to laying line 10 and formed along elongated members 17 (FIG. 2).

Figure 6:
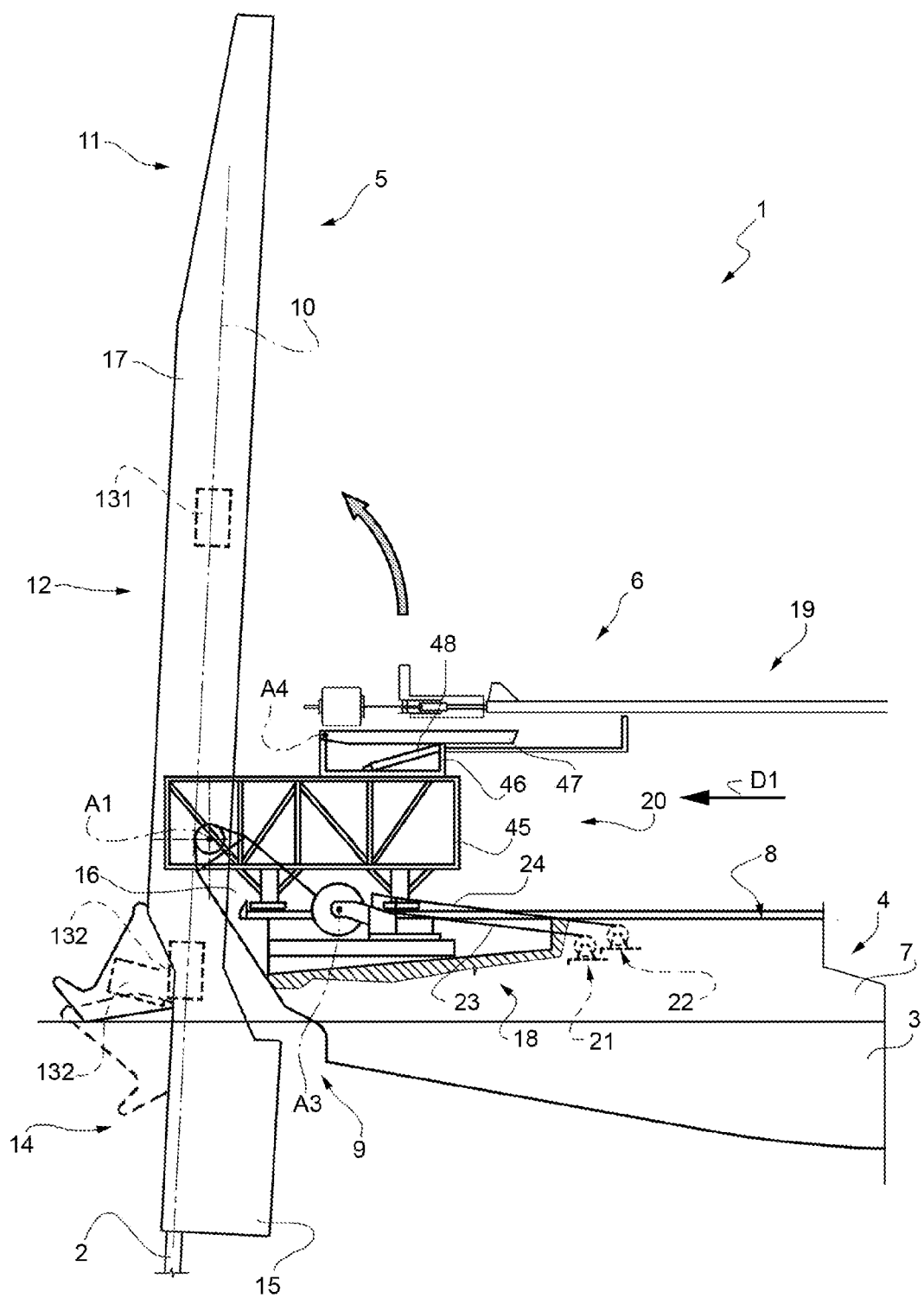
FIGS. 6 and 7 show schematic side views, with parts removed for clarity, of the laying vessel at respective pipeline abandon configuration stages.
Figure 7:
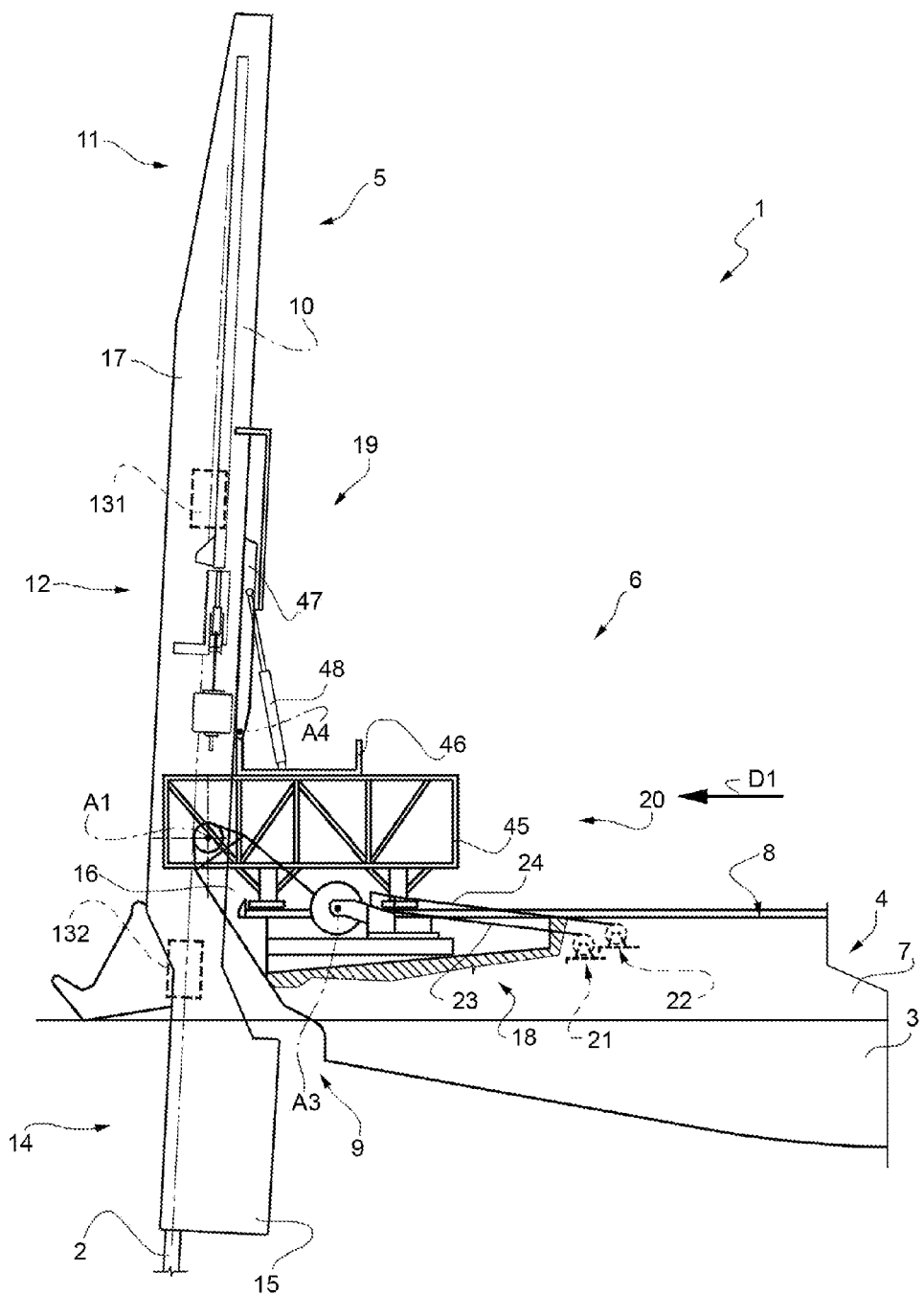

As shown in FIGS. 6 and 7, locating device 20 comprises a frame 45 movable along weather deck 8 in direction D1; a frame 46 mounted on frame 45 to move in direction D1; and a support 47 hinged to frame 46 and configured to support auxiliary tool 19. Locating device 20 is at least partly insertable between elongated members 17 of laying tower 5, to align auxiliary tool 19 with laying line 10 inside the laying tower, as shown in FIG. 5. In one embodiment, frame 45 runs along rails (not shown) on weather deck 8, and frame 46 runs along rails (not shown) on frame 45. Frames 45 and 46 are moved by respective actuators (not shown), and support 47 is tilted by a further actuator 48 which, in the example shown, is a hydraulic cylinder.

In actual use, switching from pipeline 2 laying mode to pipeline 2 abandon mode comprises:
connecting ropes 23 and 24 to sheave assembly 18;
inserting auxiliary tool 19 inside laying tower 5;
connecting auxiliary tool 19 to pipeline 2;
positioning sledge 40 of auxiliary tool 19 beneath the travelling plane of sheave assembly 18;
moving sheave assembly 18 into the work position;
connecting ropes 23 and 24 to form haul line 23, 24, which is guided by sheaves 27, 28 and 42.

To avoid interference between sledge 40 and sheave assembly 18, sheave assembly 18 can only be moved into the work position when sledge 40 of auxiliary tool 19 is located beneath sheave assembly 18.

Figure 8:
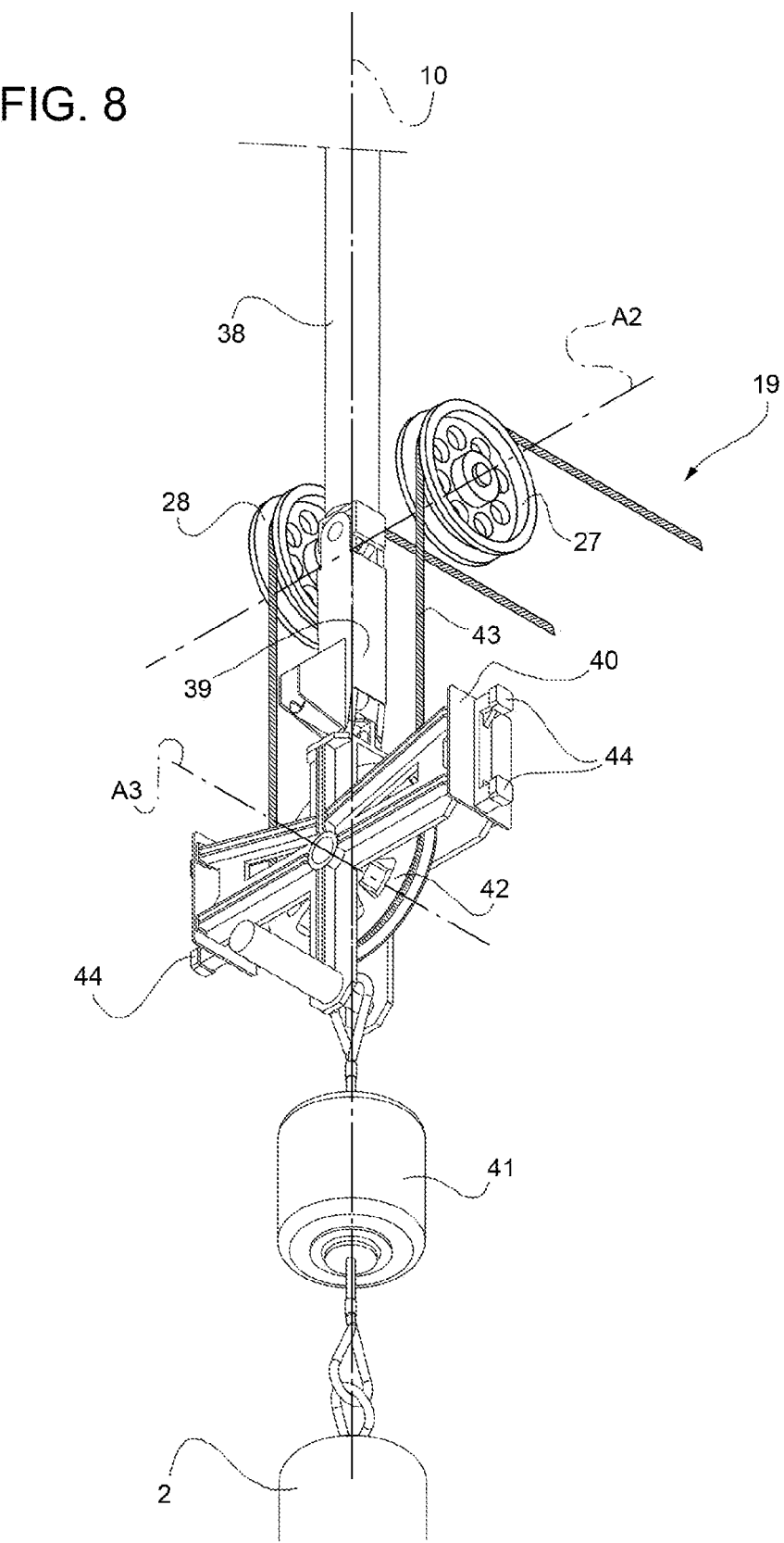
FIG. 8 shows a larger-scale view in perspective, with parts removed for clarity, of a pipeline abandon configuration stage.

As shown in FIG. 8, ropes 23 and 24 are connected by messenger line 43 wound beforehand about sheave 42. At this stage, pipeline 2 is connected to auxiliary tool 19, in turn supported by top gripping assembly 131 (FIG. 1) gripping dummy string 38; and the ends of messenger line 43 are released from dummy string 38 and wound about sheaves 27 and 28.

Figure 9:
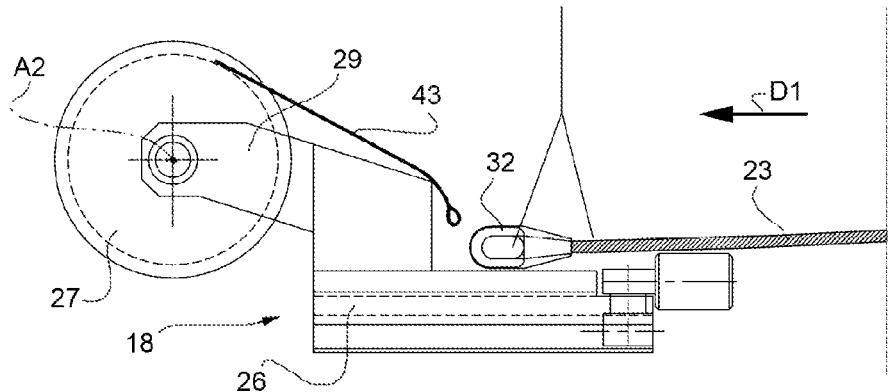
FIGS. 9, 10, 11, 12, 13 and 14 show side views, with parts removed for clarity, of respective A&R configuration stages.
Figure 10:
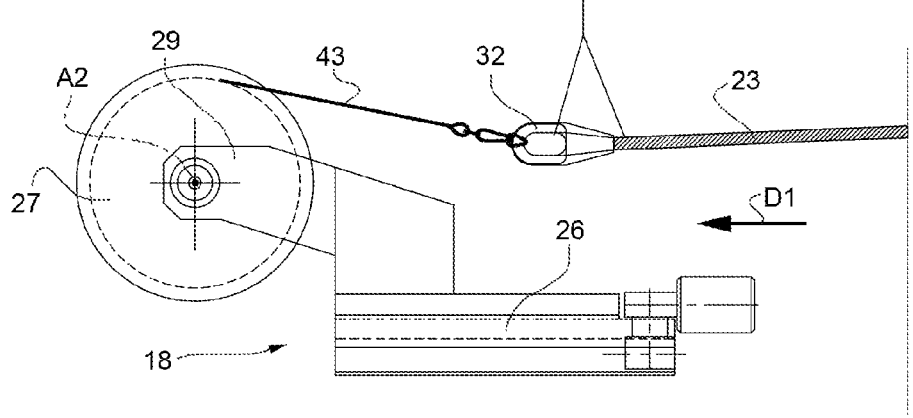
Figure 11:
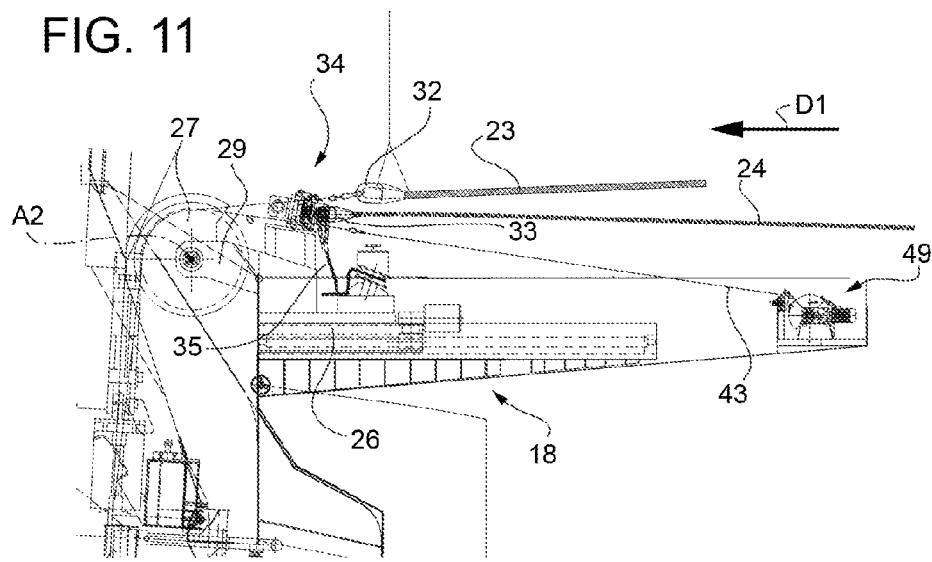
Figure 12:
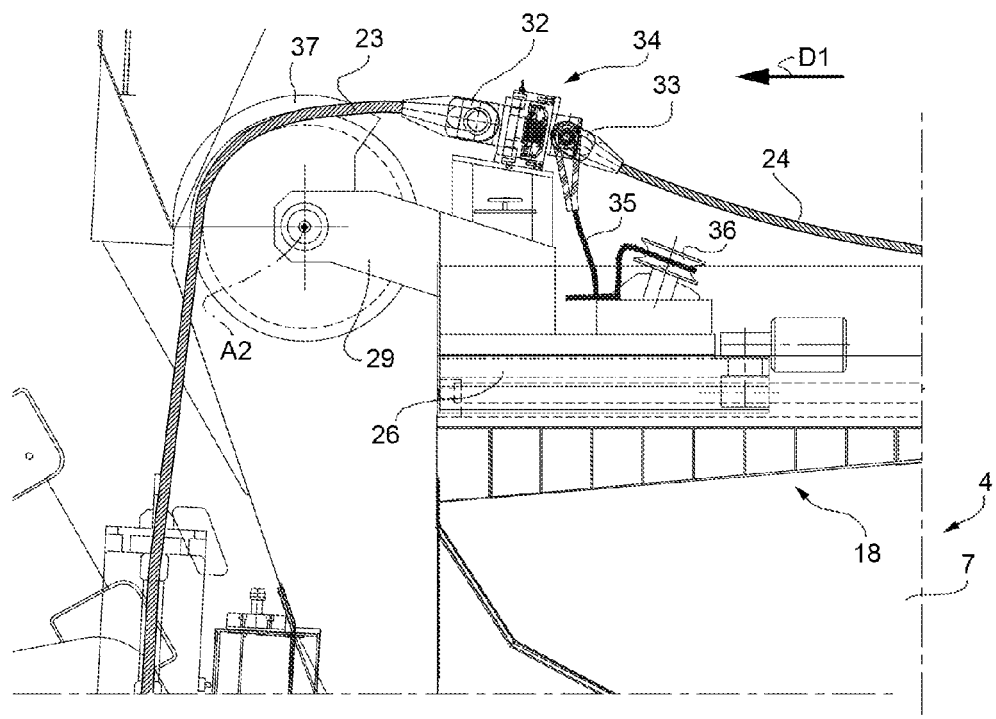
Figure 13:
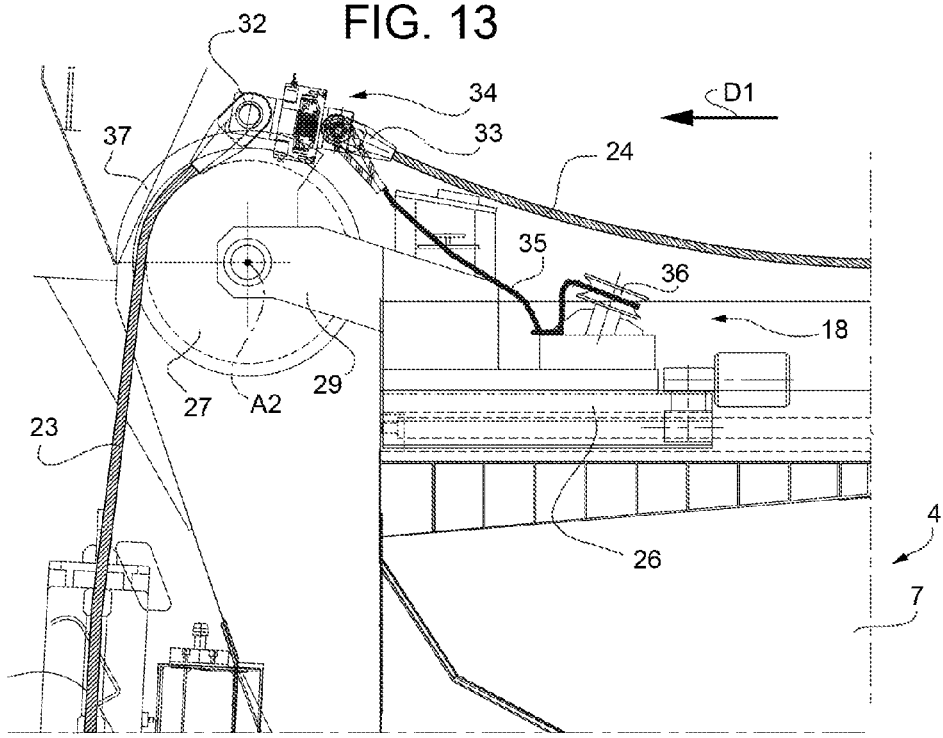
Figure 14:
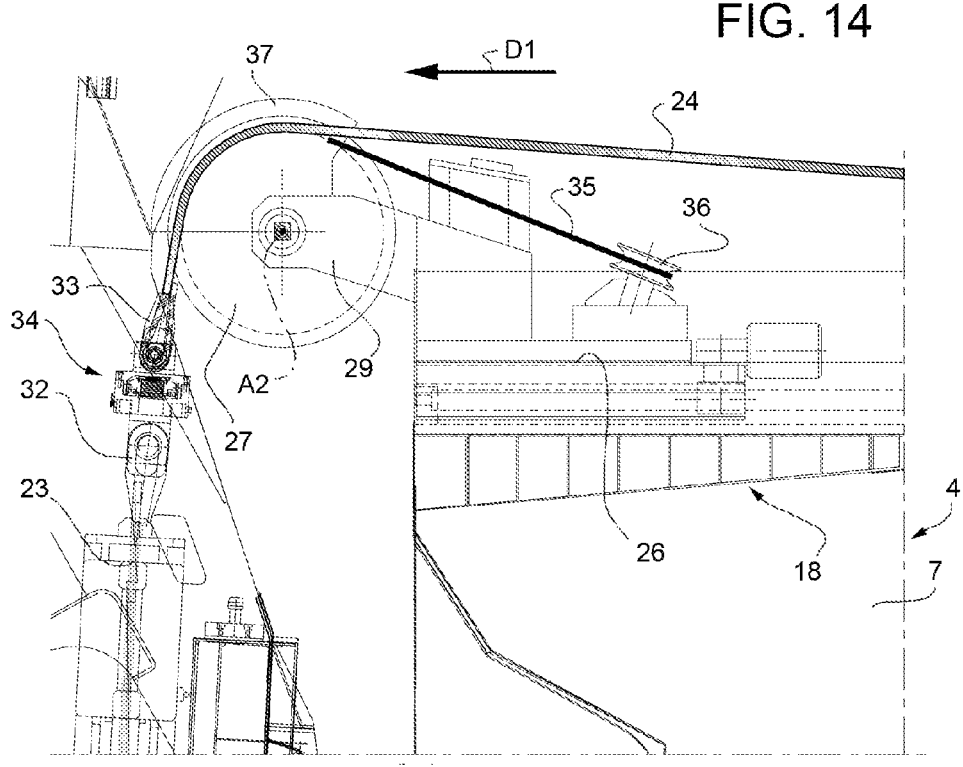
Figure 15:
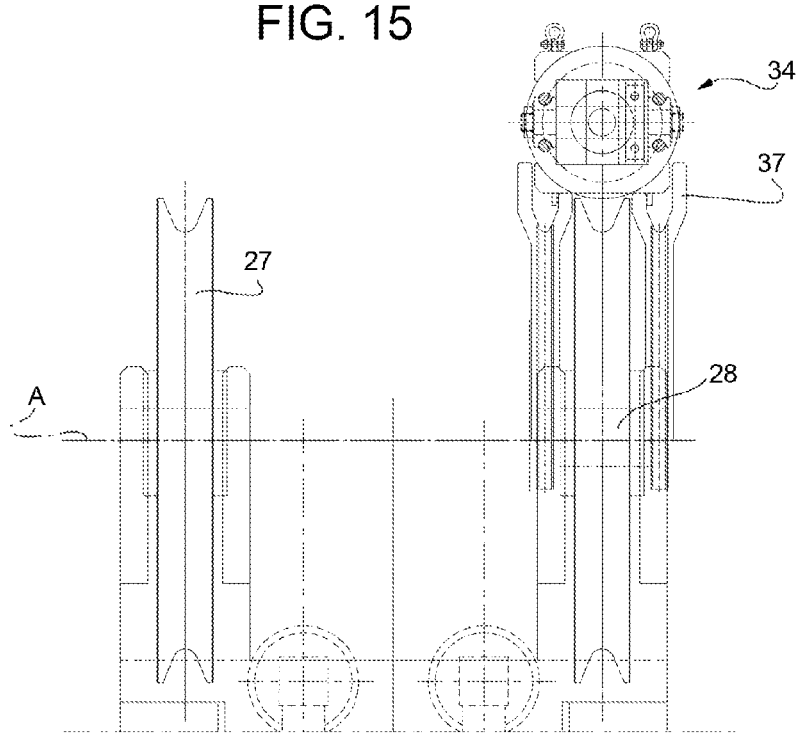
FIG. 15 shows a plan view, with parts removed for clarity, of an A&R configuration stage.

As shown in FIGS. 9 and 10, messenger line 43 is connected at one end to the end of rope 23, and at the other end to a service winch 49 (FIG. 11). As shown in FIG. 11, service winch 49 takes up messenger line 43 to position the end of rope 23 at connecting device 34 and connect eyelet 32 of rope 23 to connecting device 34 as shown in FIG. 12. At this point, haul line 23, 24 is connected, rope 23 is drawn by respective winch 21 (FIG. 1), and rope 24 is released from respective winch 22 (FIG. 1) to position connecting device 34 along guide 37, as shown in FIG. 13. Travel of connecting device 34 along guide 37 is shown in more detail in FIG. 15. Ropes 23 and 24 are wound and unwound respectively until connecting device 34 passes sheave 28 (FIG. 15) and temporary rope 35 is tensioned (FIG. 14). At which point, temporary rope 35 is detached and recovered, and haul line 23, 24 can be tensioned to support the load of pipeline 2. Once the load of pipeline 2 is transferred to haul line 23, 24, locking device 39 is released from sledge 40, which is lowered into body of water 3 together with pipeline 2.

Before lowering sledge 40 out of laying tower 5, bottom gripping assembly 132 (FIG. 1) is tilted away from laying line 10 to avoid interfering with sledge 40.

The advantages of the present disclosure substantially consist in converting the laying vessel rapidly from laying mode to A&R mode; and in not obstructing laying work, by virtue of the A&R system as a whole being substantially located at a distance from the laying tower.

It should be appreciated that changes may be made to the embodiment of the disclosure described without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A pipeline laying vessel comprising:
    a floating structure having a stern and a bow;
    a laying tower hinged to the floating structure about a first axis of rotation and configured to facilitate an assembly and laying of a pipeline on a bed of a body of water; and
    a pipeline abandon and recover system including:
        a haul line, and
        a sheave assembly configured to guide the haul line, said sheave assembly being mounted, at the stern, to the floating structure, and said sheave assembly being moveable, in a direction perpendicular to the first axis of rotation, from a work position at the laying tower to a rest position away from the laying tower, and from the rest position away from the laying tower to the work position at the laying tower, wherein the rest position is a first distance, along a plane, from the bow of the floating structure and the work position is a second, greater distance, along the plane, from the bow of the floating structure.

2. The pipeline laying vessel of claim 1, wherein:
    the laying tower includes two elongated members and defines a laying line between the two elongated members, and
    the sheave assembly is insertable at least partly between the two elongated members and proximal to the laying line in the work position.

3. The pipeline laying vessel of claim 1, wherein the plane is beneath the first axis of rotation.

4. The pipeline laying vessel of claim 1, wherein:
    the laying tower includes at least two gripping assemblies, at least one of which is movable with respect to the other, and
    the plane is between the two gripping assemblies.

5. The pipeline laying vessel of claim 1, wherein:
    the floating structure includes two parallel arms, and
    the laying tower is hinged to free ends of the parallel arms.

6. The pipeline laying vessel of claim 1, wherein the sheave assembly includes a sledge, a first sheave and a second sheave, said first sheave and said second sheave mounted to rotate about a second axis of rotation parallel to the first axis of rotation.

7. The pipeline laying vessel of claim 6, wherein the first sheave and the second sheave are located on opposite sides of a laying line defined by the laying tower.

8. The pipeline laying vessel of claim 6, wherein the pipeline abandon and recover system includes:
    a first winch and a second winch,
    a first rope operated by the first winch,
    a second rope operated by the second winch, and
    a connecting device configured to connect an end of the first rope and an end of the second rope to form the haul line.

9. The pipeline laying vessel of claim 1, wherein the pipeline abandon and recover system includes an elongated auxiliary tool configured to be retained by the laying tower along a laying line defined by the laying tower, and configured to be connected to the pipeline.

10. The pipeline laying vessel of claim 9, wherein the elongated auxiliary tool includes:
    a dummy string configured to be gripped by the laying tower,
    a sledge configured to be guided by the laying tower, and
    a sheave configured to rotate about a second axis of rotation with respect to the sledge to guide the haul line.

11. The pipeline laying vessel of claim 10, wherein the elongated auxiliary tool includes a messenger line wound about the sheave.

12. The pipeline laying vessel of claim 9, which includes a locating device fitted movably to the floating structure and configured to: (i) position the elongated auxiliary tool inside the laying tower, and (ii) extract the elongated auxiliary tool from the laying tower.

13. The pipeline laying vessel of claim 12, wherein the locating device is insertable at least partly inside the laying tower and movable in a designated direction along the floating structure.

14. The pipeline laying vessel of claim 12, wherein the locating device includes:
    a first frame mounted to move along the floating structure, and
    a support which tilts about a second axis of rotation parallel to the first axis of rotation, the support being configured to house the elongated auxiliary tool.

15. The pipeline laying vessel of claim 14, wherein the locating device includes a second frame mounted to move along the first frame, the support being fitted to the first frame.

16. A method of operating a laying vessel including a floating structure having a stern and a bow, a laying tower hinged to the floating structure about a first axis of rotation and configured to facilitate an assembly and laying of a pipeline on a bed of a body of water, and a pipeline abandon and recover system including a haul line and a sheave assembly configured to guide the haul line, said method comprising:
    selectively running the sheave assembly along the floating structure, in a direction perpendicular to the first axis of rotation, from a work position at the laying tower to a rest position away from the laying tower and from the rest position away from the laying tower to the work position at the laying tower, wherein said sheave assembly is mounted, at the stern, to the floating structure, the rest position is a first distance, along a plane, from the bow of the floating structure and the work position is a second, greater distance, along the plane, from the bow of the floating structure.

17. The method of claim 16, which includes securing the haul line to the sheave assembly before moving the sheave assembly into the work position.

18. The method of claim 16, wherein the laying tower includes two elongated members and defines a laying line between the two elongated members, and which includes inserting the sheave assembly at least partly between the two elongated members and proximal to the laying line in the work position.

19. The method of claim 16, wherein the plane is beneath the first axis of rotation.

20. The method of claim 16, wherein the plane is between two gripping assemblies of the laying tower.

21. The method of claim 16, wherein the sheave assembly includes a sledge, a first sheave and a second sheave, said first and second sheaves mounted to rotate about a second axis of rotation parallel to the first axis of rotation and which includes positioning the first sheave and the second sheave in the work position, on opposite sides of a laying line defined by the laying tower.

22. The method of claim 21, which includes:
joining a first rope and a second rope by a connecting device to form the haul line, and
connecting the haul line to the pipeline.
23. The method of claim 22, which includes:
connecting an auxiliary tool, retainable by the laying tower, to the pipeline,
connecting the second rope to a messenger line wound about a third sheave of the auxiliary tool and about the first sheave and the second sheave, and
winding the messenger line to position an end of the second rope at an end of the first rope.
24. The method of claim 16, which includes positioning an auxiliary tool in the laying tower by a locating device fitted movably to the floating structure.
25. The method of claim 24, which includes inserting the locating device at least partly inside the laying tower in a direction perpendicular to the first axis of rotation.
26. The method of claim 25, which includes:
moving a first frame of the locating device along the floating structure, and
rotating a support of the auxiliary tool, which is tiltable about a second axis of rotation parallel to the first axis of rotation.

27. A method of setting a pipeline laying vessel having a stern and a bow to a pipeline abandon mode, the method comprising:
connecting two ropes, configured to form a haul line, to a sheave assembly mounted, at the stern, to the pipeline laying vessel;
inserting an auxiliary tool, including a sheave, inside a laying tower hinged to the pipeline laying vessel;
connecting the auxiliary tool to a pipeline;
positioning the sheave beneath a travelling plane of the sheave assembly;
moving the sheave assembly along the travelling plane from a rest position to a work position, in which the sheave assembly is located at least partly inside the laying tower, wherein the rest position is a first distance, along the traveling plane, from the bow of the pipeline laying vessel and the work position is a second, greater distance, along the traveling plane, from the bow of the pipeline laying vessel;
looping at least one of the two ropes about the sheave assembly and the sheave; and
connecting the two ropes.

* * * * *